Dec. 27, 1927.  
W. E. TRUMPLER  
FLEXIBLE COUPLING  
Filed Oct. 1, 1923
1,654,312
3 Sheets-Sheet 1
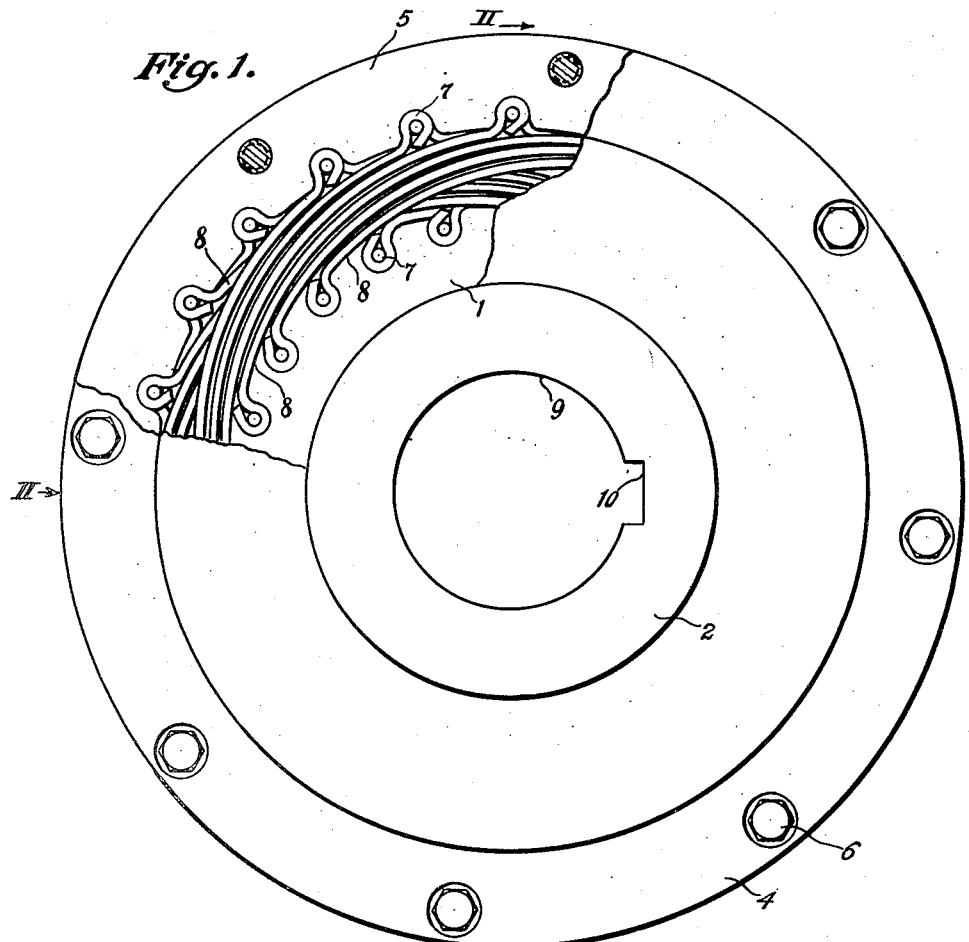
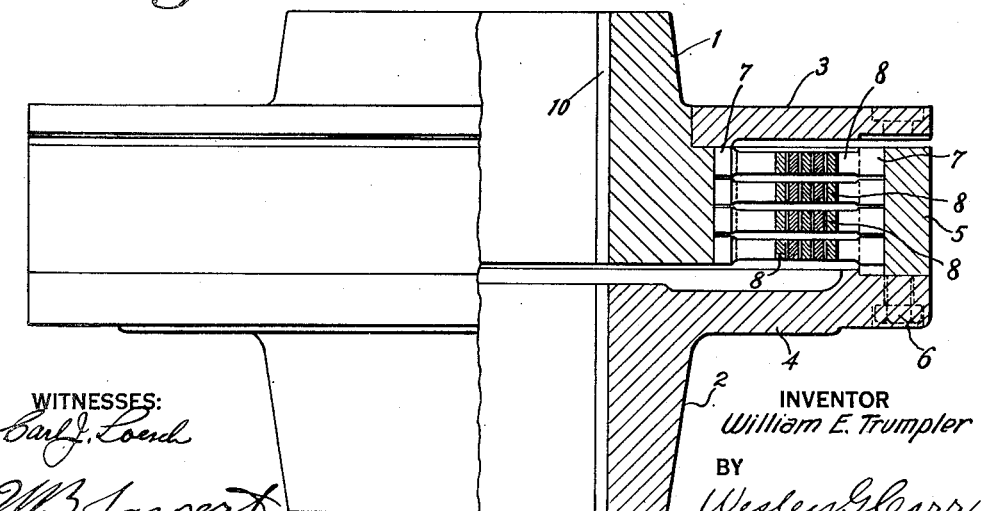
WITNESSES:
INVENTOR  
*William E. Trumpler*  
BY  
ATTORNEY Dec. 27, 1927.  
W. E. TRUMPLER  
1,654,312  
FLEXIBLE COUPLING  
Filed Oct. 1, 1923 3 Sheets-Sheet 2
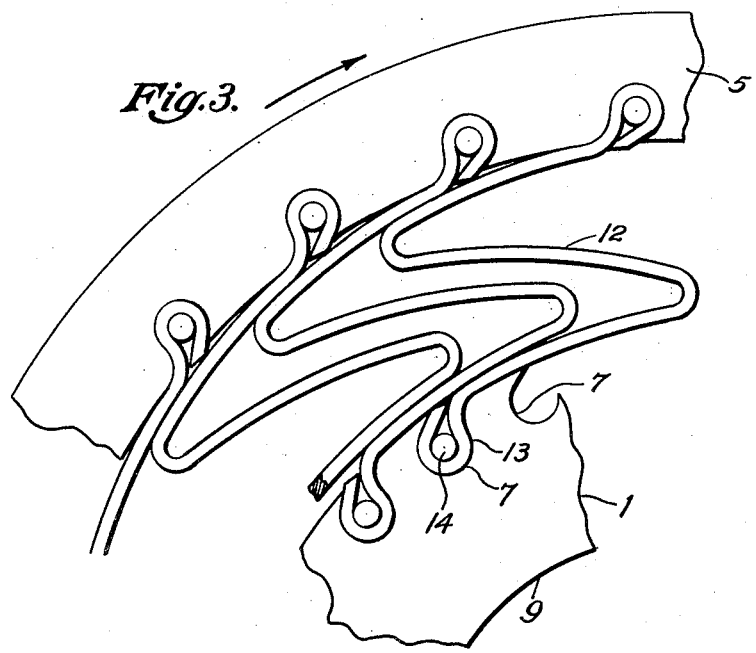
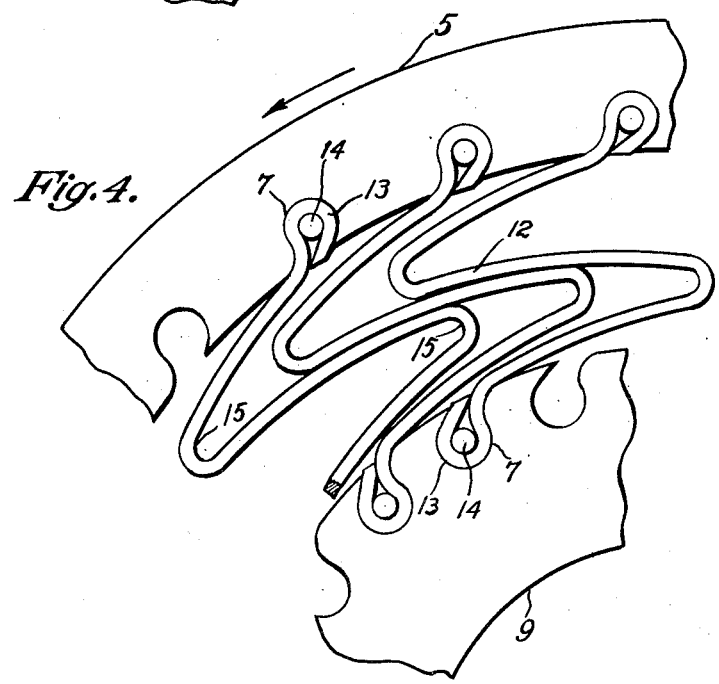
INVENTOR  
William E. Trumpler Dec. 27, 1927.  
W. E. TRUMPLER  
FLEXIBLE COUPLING  
Filed Oct. 1, 1923

1,654,312

3 Sheets-Sheet 3

WITNESSES:  
Carl J. Loesch  
W. B. Jaspert

INVENTOR  
William E. Trumpler  
BY  
Wesley G. Carr  
ATTORNEY

Patented Dec. 27, 1927.

1,654,312

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE COUPLING.

Application filed October 1, 1923. Serial No. 666,025.

My invention relates to flexible couplings of the type utilized in coupling a pair of shafts, such as the shafts of a motor-generator set or the like, and it is among the objects thereof to provide a flexible coupling which shall have a relatively large degree of flexibility in transmitting torque and be capable of running with considerable misalinement.

It is a further object of my invention to provide a device of the above described character which shall be of simple compact mechanical construction, which shall be strong, durable and efficient in operation, which shall avoid any rubbing surfaces and lubrication, and which shall be applicable to a variety of uses, particularly under variable loads and severe operating conditions where it is desired to obtain a high degree of flexibility between coupled co-operating drive members with a relatively large torque transmitting capacity.

Flexible couplings usually embody yielding or flexible elements that produce resilience between the coupled members for the purpose of permitting a certain amount of misalinement and angular displacement. Such flexible elements are designed for the specific application at hand and are further limited in their application by their inherently weak design in that the flexible member usually comprises various forms of spring structures or other yieldingly co-operating members.

My present invention is directed to the provision of yieldingly co-operating members in which the flexible element comprises a plurality of sets of spring members so arranged and disposed as to produce an equal amount of resilience for both directions of rotation, the spring members being designed and assembled to limit the working stresses exerted thereon by limiting their deflection in a manner as will be hereinafter set forth. The springs are designed and arranged to permit a large number to be assembled within a relatively small diameter resulting in a compact structure.

Figure 7:
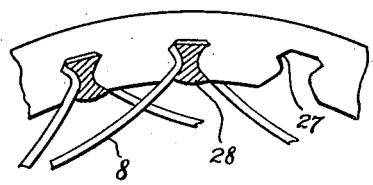
Figure 5:
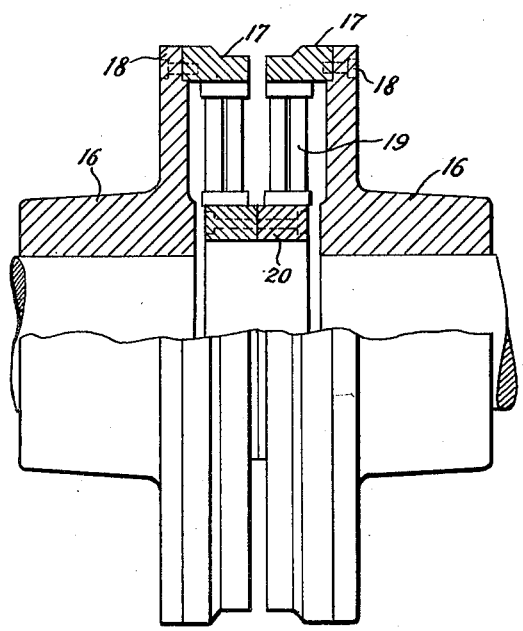
Figure 6:
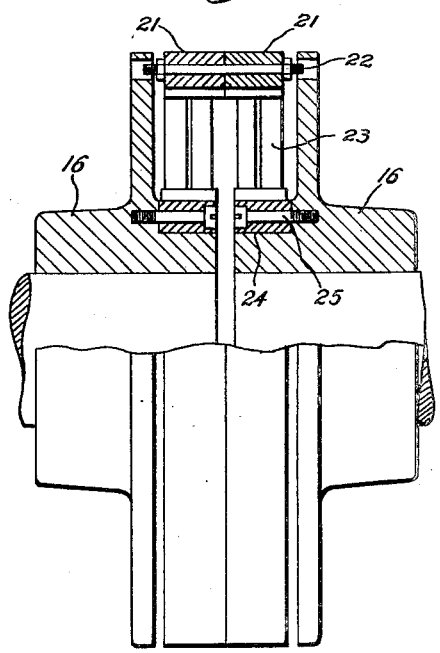

In the accompanying drawings constituting a part hereof and in which like reference characters designate like parts, Fig. 1 is an end elevational view of a flexible coupling, one of the flanges being partially broken away to illustrate the position of the spring members, Fig. 2 is a view thereof, partially in cross-section and partially in elevation, Figs. 3 and 4 are fragmentary views of the coupling showing modified forms of spring members in their extreme deflected conditions, Figs. 5 and 6 are views, partially in cross-section and partially in elevation, of modifications of my invention, and Fig. 7 is a fragmentary portion of a rim member and springs showing the means for assembling or securing the spring elements in place.

Referring to Fig. 1, the coupling comprises a plurality of hub members 1 and 2, provided with flanges 3 and 4, respectively, which may be secured to the hubs or may be formed integrally therewith, as shown in Fig. 2. A rim member 5 is secured to the flange 4 by bolts 6 and the hub member 1 and rim 5 are provided with slotted openings 7 for receiving leaf springs 8. Hubs 1 and 2 are provided with central openings 3 and key ways 10 by which they are mounted and secured to shafts of driving and driven machines, such as the shafts of dynamo-electric machines.

The spring members illustrated in Fig. 1 consists of leaf springs bent into the shape of a segment of a circle at their central portions. The ends thereof are curled in opposite directions and are pressed in flask shaped loops to fit the slotted openings 7 of the hub and rim. The shape of the springs when assembled corresponds closely to an involute curve.

As illustrated in Fig. 2, there are four sets of springs 8 alternate sets being angularly disposed in opposite directions so that two sets of springs work under compression and the other two under tension for either direction of rotation of the coupling.

The stresses of the springs are limited by providing the proper spaced relation between them whereby, when the coupling is stressed beyond its normal capacity, the spring members 8 are wound upon each other to effect engagement of the respective spring elements thereby preventing any further deflection at the highly stressed portions which are near the points of fastening. The spring members working under tension wind upon the inner ring or hub 1, Fig. 1, whereas those under compression wind up on the inside of the outer rim 5. Under these conditions, the coupling has a reduced flexibility but a much greater strength without increasing the stress in the material of the springs. This characteristic of the springs is extremely advantageous as it gives great flexibility under ordinary working conditions and at the same time great strength against breakage when overloaded.

Referring to Figs. 3 and 4 a modified form of spring element 12 of substantially Z-shape is utilized intermediate the rim 5 and hub 1. The elements 12, which have flask shape ends 13 fitted into the openings 7, are secured therein by pins or wedges 14. The springs when deflected to the limit by reason of a heavy load in the direction of the arrow, will assume the shape shown in Fig. 3, the springs engaging a substantial portion of the end legs of the Z at the outer and the inner ends. When stressed in the opposite direction, the springs will assume a shape shown in Fig. 4, where the slightly curved central portions of the springs are in engagement. These engagements limit the deflection of the spring members for torque in either direction of rotation to prevent over-stressing when abnormally loaded. For one direction of rotation, the spring element will be positioned as shown in Fig. 3 and for the opposite direction of rotation as shown in Fig. 4. The springs in their unloaded condition clear each other by a space sufficient for the necessary deflection for a torque in either direction. A plurality of sets of springs are not required but a single set may be utilized for the purpose of obtaining adequate strength and equal resilience for both directions of rotation.

Fig. 5 illustrates my preferred form of coupling the construction of which comprises a pair of flanged hub members 16 having a pair of rings 17 secured thereto by screw bolts 18, the rings 17 being co-operately engaged by spring members 19 with ring or hub members 20.

The coupling may be disengaged by removing the inner rings 20, spring elements 19 and the rims 17 as a unit without removing the hubs 16 from their shafts. This may be accomplished by removing the screw bolts 18, springing the rims 17 towards each other and lifting the flexible unit out from between the hub flanges.

In Fig. 6, the coupling of the hub members 16 is effected through a pair of rings 21 joined together by through-bolt 22 and a plurality of leaf springs 23 secured by rings 24 and screw bolts 25 to the hubs 16.

In Fig. 7, I have illustrated another means for securing the spring members 8 to the coupling by providing double dovetailed notches 27 in which the springs 8 are fitted and secured by correspondingly shaped wedges 28.

It is evident from the above description of my invention that flexible couplings made in accordance therewith provide a large degree of resiliency and have relatively great torque transmitting power for a coupling of small diameter. The compactness of the structure is made possible by the disposition of the spring members which are so arranged as to permit crowding a relatively large number thereof in a comparatively small space.

Although I have described several embodiments of my invention, it will be obvious that various changes may be made in the design of the co-operating coupling parts, the form and type of springs utilized, and the nature of material employed in the spring members. The principle of my design has many applications other than herein described.

I claim as my invention:—

1. A flexible coupling comprising a pair of hubs, a rim member co-operating therewith and a plurality of alternately angularly disposed flexible spring members for connecting the hubs to the rim member.

2. A flexible coupling comprising a pair of hubs, a rim member co-operating therewith and a plurality of alternately angularly disposed spring members, for connecting the hubs to the rim member, the degree of flexure of which is limited.

3. A flexible coupling comprising a pair of hubs, a rim member co-operating therewith and a plurality of sets of springs angularly disposed intermediate said hubs and rim, the springs of alternate sets being disposed in opposite directions.

4. A flexible coupling comprising a pair of hubs, a rim member co-operating therewith and a plurality of sets of springs angularly disposed intermediate said hubs and rim, and secured thereto by wedges of substantially dove-tail shape.

5. A flexible coupling comprising a pair of hubs, a rim member co-operating therewith and a plurality of alternately angularly disposed flexible spring members, said spring members being adapted to be respectively engaged at one end for transmission of torque in one direction of rotation of the coupling and at their other ends for transmission of torque in the opposite direction.

6. A flexible coupling comprising a pair of rigid members adapted to be coupled to a drive mechanism and a flexible element associated therewith comprising angularly disposed spring members that are adapted to frictionally engage each other.

7. A flexible coupling comprising a pair of rigid coupling members and a flexible intermediate member embodying alternately angularly disposed groups of spring members that are adapted to frictionally engage each other for transmission of torque in one direction.

8. A flexible coupling comprising a pair of rigid coupling members and a flexible intermediate member secured thereto, said flexible member having curved springs that are adapted to frictionally engage each other at one end for transmission of torque in one direction of rotation and at their opposite ends for transmission of torque in the opposite direction.

In testimony whereof, I have hereunto subscribed my name this 26th day of September 1923.

WILLIAM E. TRUMPLER.